United States Patent [19]

Bruensicke

[11] 4,420,047
[45] Dec. 13, 1983

[54] STOWABLE FIRE SUPPRESSION SYSTEM FOR AIRCRAFT CABINS AND THE LIKE

[75] Inventor: Wilhelm A. Bruensicke, Santa Monica, Calif.

[73] Assignee: Lockheed Corporation, Burbank, Calif.

[21] Appl. No.: 335,238

[22] Filed: Dec. 28, 1981

[51] Int. Cl.³ .............................................. A62C 25/00
[52] U.S. Cl. ....................................... 169/53; 169/62; 239/417
[58] Field of Search ....................... 169/53, 52, 51, 54, 169/62, 24, 5, 26, 27, 19, 14, 15, 13; 239/428.5, 427.5, 416.5, 417, 432; 244/129.2, 118.5, 118.1

[56] References Cited

U.S. PATENT DOCUMENTS

| 548,780 | 10/1895 | Eads | 169/15 |
|---|---|---|---|
| 651,102 | 6/1900 | Cazin | 169/15 |
| 2,368,178 | 1/1945 | Turpin | 239/417 |
| 2,799,352 | 7/1957 | Boerner et al. | 169/14 |
| 2,832,424 | 4/1958 | Hurst | 169/15 |

FOREIGN PATENT DOCUMENTS

| 2385411 | 12/1978 | France | 169/24 |
|---|---|---|---|
| 326578 | 3/1930 | United Kingdom | 169/15 |

*Primary Examiner*—Jospeh J. Rolla
*Assistant Examiner*—Kenneth Noland
*Attorney, Agent, or Firm*—Louis L. Dachs

[57] ABSTRACT

The conventional potable water distribution system (310, 318) or other water supply system conventionally provided in passenger aircraft and other large passenger vehicles such as boats and trains may be modified to provide a convenient source of water under high pressure (300, 302) for fire suppression purposes. A mobile cart (10) that can be conveniently stowed inside the passenger area is provided with a source of foaming agent (132, 134), a mixing nozzle (148), and the required valves and hoses (128, 142, 150). A plurality of pressurized water outlets may be located throughout the passenger area. The cart's water inlet hose (128) is provided with a suitable quick connect/disconnect fitting (130). In order to provide the greatest versatility and effectiveness, the mixing nozzle (148) is provided with a convenient control (168) whereby the operator may choose between a heavy mist of plain water, a relatively dense foam, or a relatively light foam. As a result, it is possible to provide more effective fire suppression than if it were necessary to equip a number of individual fire fighting stations within the cabin. Furthermore, since the cart utilizes an existing supply of water (310), a substantial quantity of water is made available for emergency use at no additional cost or weight penalty.

6 Claims, 17 Drawing Figures

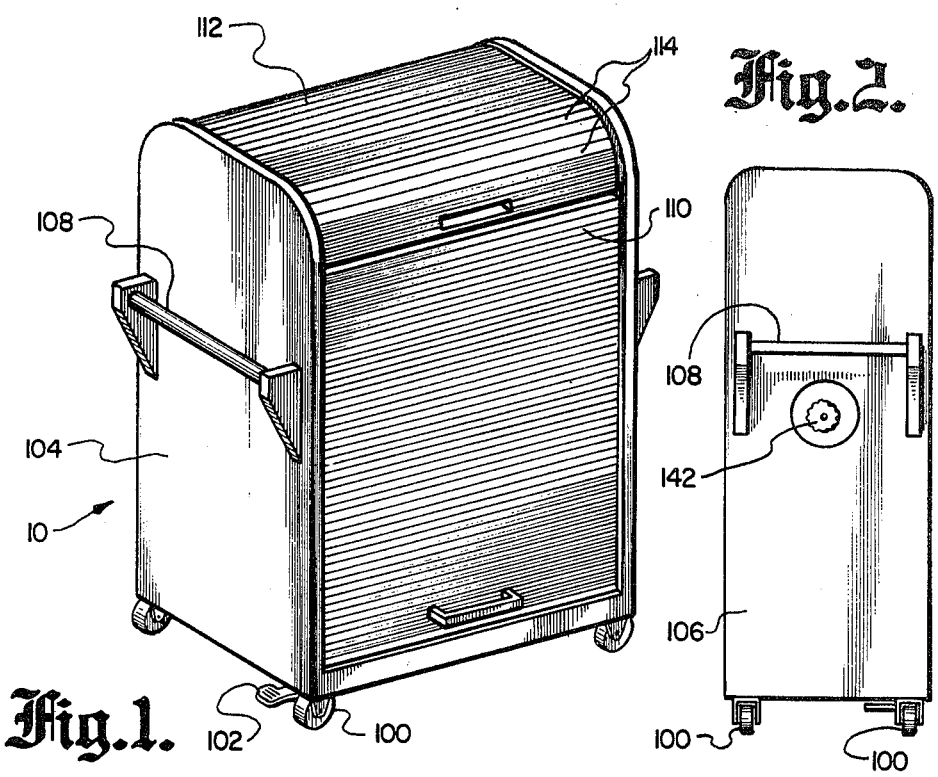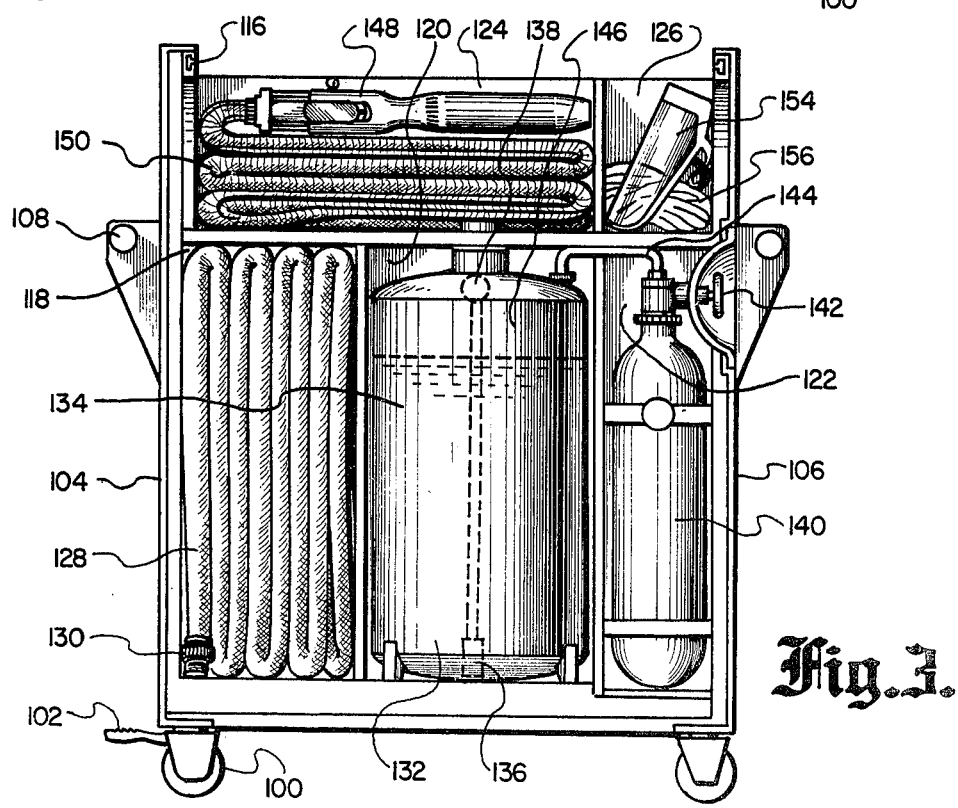

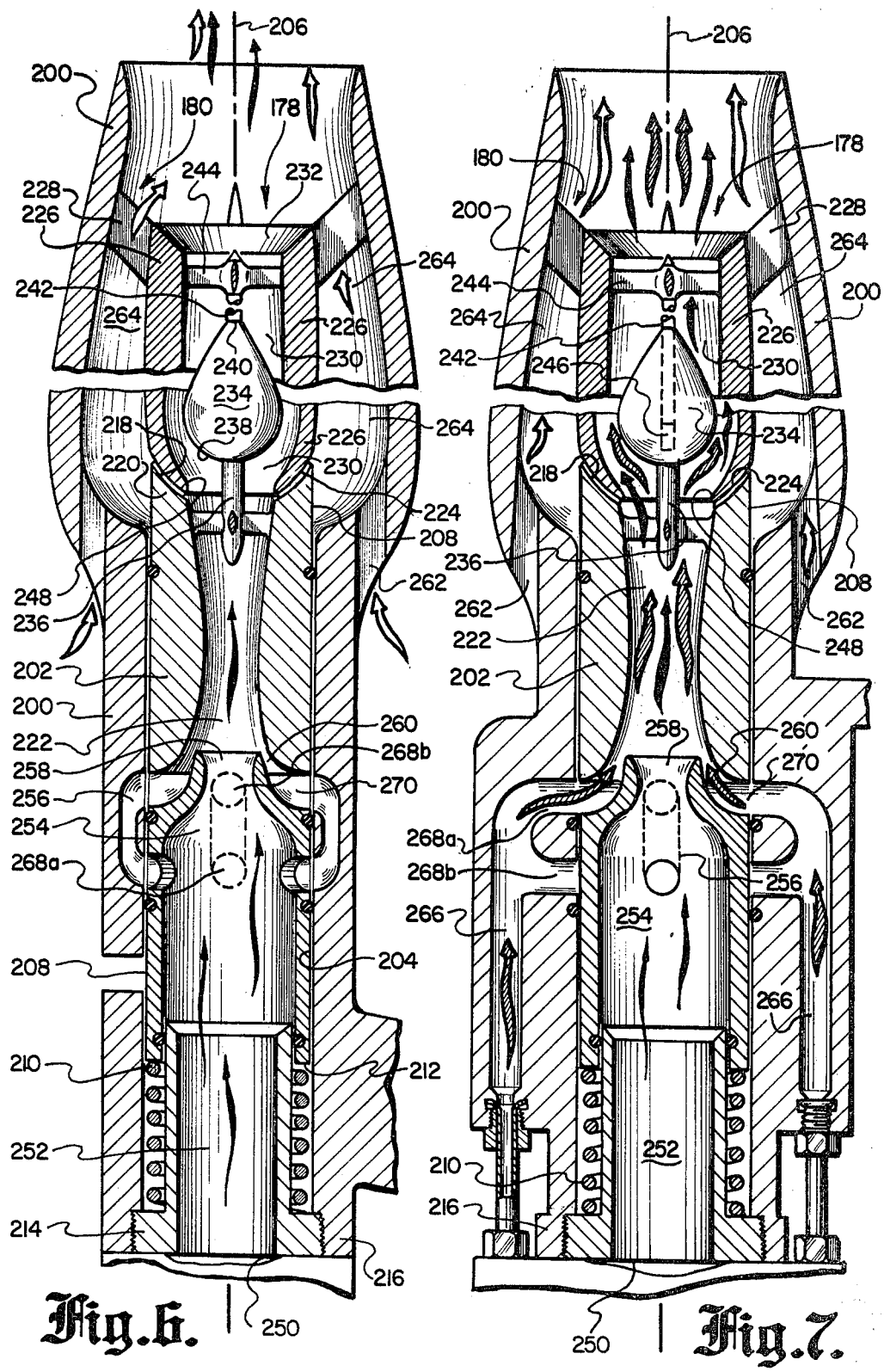

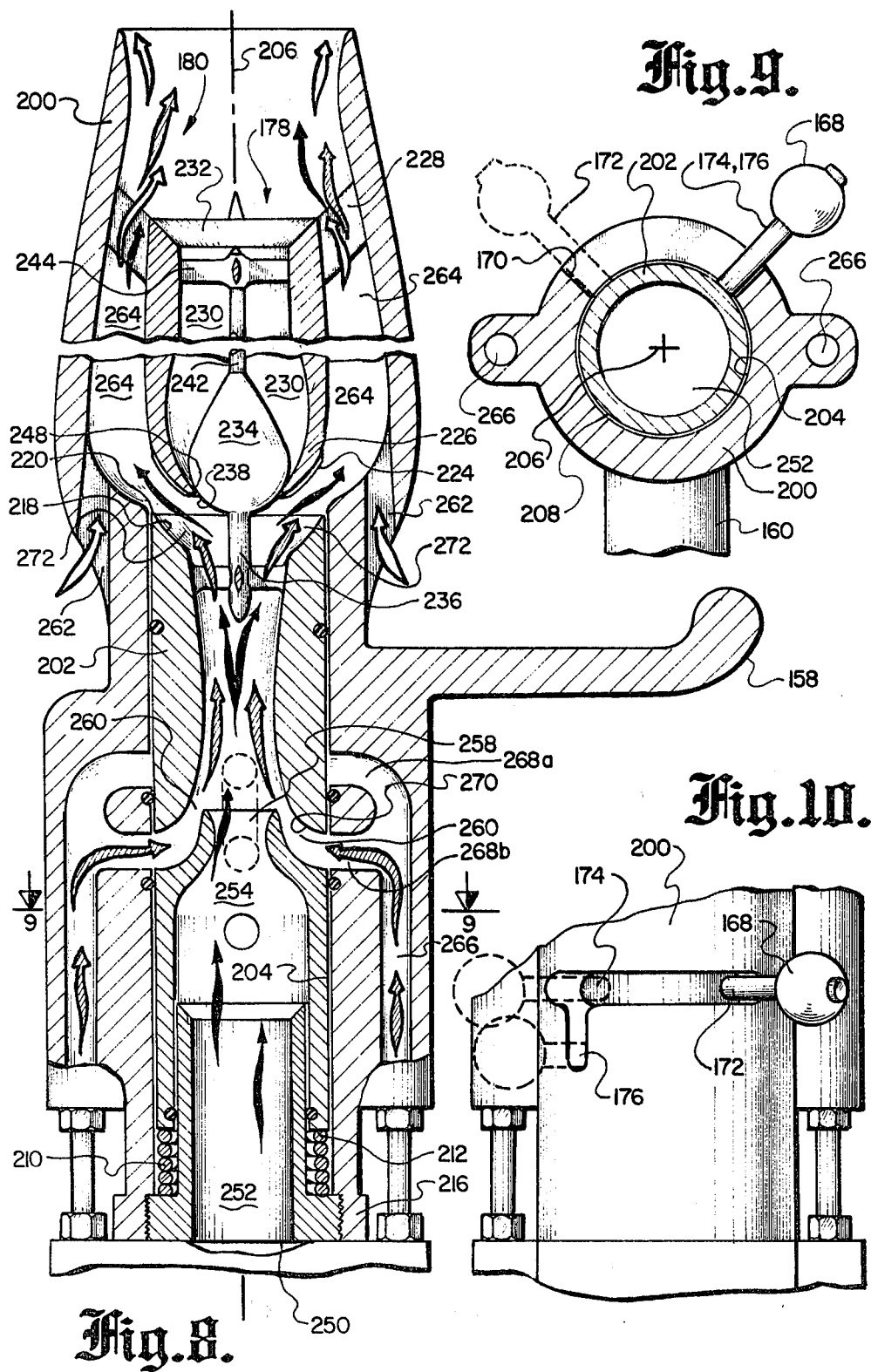

STOWABLE FIRE SUPPRESSION SYSTEM FOR AIRCRAFT CABINS AND THE LIKE

TECHNICAL FIELD

The present invention relates generally to apparatus and methods for suppressing fires and, more particularly, to an improved fire fighting system in the form of fire fighting equipment that utilizes water from a modified cabin water supply system and that is contained within a mobile cart or otherwise readily available for use in the cabin of passenger aircraft, etc.

BACKGROUND ART

The passenger compartments of large commercial aircraft and other similar transportation vehicles are conventionally provided with portable fire extinguishers containing dry chemicals, halon, carbon dioxide, or water that are intended for use on various specific types of fires and that can generate only a very limited supply of fire suppressing powder, gas, or liquid for a very limited duration (about 15 seconds).

However, the known prior art was not capable of being promptly and conveniently attached to a modified cabin water supply system so as to make a substantial quantity of water and foam available for use with effective fire suppression apparatus that can be contained within a relatively lightweight mobile cart.

DISCLOSURE OF INVENTION

The conventional potable water distribution system or other water supply system conventionally provided in passenger aircraft and other large passenger vehicles such as boats and trains may be readily modified in accordance with the teachings of the present invention so as to provide a convenient source of water under high pressure for fire suppression purposes.

Preferably, a mobile cart that can be conveniently stowed inside the aircraft cabin or other passenger area is provided with a pressurized source of a suitable foaming agent, a multi-function mixing nozzle, and a system of valves and hoses for effecting the required connections.

By locating a plurality of pressurized water outlets throughout the passenger area and by providing the cart's water inlet hose with a suitable quick connect/disconnect fitting, the resultant cart is relatively light in weight and may be conveniently used at any location within the interior. Accordingly, it is possible to provide more effective fire suppression than if it were necessary to equip a number of individual fire fighting stations within the cabin. Furthermore, since the cart utilizes an existing supply of water, a substantial quantity of water is made available for emergency use at no additional cost or weight penalty.

In order to provide the greatest versatility and effectiveness, the mixing nozzle is provided with a convenient control whereby the crew member may choose between a heavy mist of plain water, a relatively dense foam, or a relatively light foam.

BRIEF DESCRIPTION OF THE DRAWINGS

FIG. 1 is an isometric view of a mobile cart equipped in accordance with the teachings of the present invention;

FIG. 2 is an end elevational view of the cart in FIG. 1;

FIG. 3 is a cross-sectional view through the interior of the cart of FIG. 1 showing the various equipment carried thereby;

FIGS. 6, 7 and 8 are cross-sectional views through the mixing nozzle of FIG. 5 in which the selected function of said nozzle is respectively a "water mist" mode, a "dense foam" mode and a "light foam" mode;

FIGS. 9 and 10 are respectively a transverse cross section and a top plan view of the nozzle's control knob which selects the various modes;

BEST MODE FOR CARRYING OUT THE INVENTION

Figure 4:
FIG. 4 illustrates the manner in which the equipment aboard the cart may be utilized during an actual emergency aboard an aircraft.

Referring now to FIGS. 1, 2 and 3, which are respectively an isometric view, an end elevational view and a cross-sectional view of a presently preferred embodiment of a mobile fire suppression cart (10) equipped in accordance with the teachings of the present invention, it may be seen that the cart is provided with four casters (100), at least one of which may be locked against rotation by a foot latch (102). Each side panel of the cart, namely, the left side panel (104) and the right side panel (106), is provided with a sturdy handle (108). The dimensions of the cart (10) are preferably comparable to other mobile carts utilized aboard aircraft (or other large passenger vehicles such as a boat or a train). Accordingly, the fire suppression cart may be conveniently stored utilizing the same facilities as are used for stowage of food service carts, etc. By means of the casters (100) and the handles (108), it can nevertheless be quickly and conveniently wheeled down the aisles of the vehicle whenever and wherever the fire suppression equipment contained within the cart is needed for use in an emergency situation. As is best seen in FIG. 1, the cart (10) is provided with two access doors providing access into the cart's interior, namely, a front access door (110) and a top access door (112). Preferably, both doors are of the self-stowing type in which a number of individual parallel slats (114) are flexibly joined to one another with their lateral ends guided by tracks (116), whereby the access doors (110, 112), when rolled into their respective open positions, will retract into the cart's interior where they will not interfere with the cart's operation, or otherwise hinder the operator of the fire fighting equipment contained therein during emergency conditions.

Referring now particularly to FIG. 3, it may be seen that the interior of the cart (10) comprises five separate areas or compartments, namely, an inlet hose compartment (118), a foaming agent compartment (120), a propellant compartment (122), an outlet hose and nozzle storage area (124) and a miscellaneous storage area (126). Inside the inlet hose compartment (118) there is provided a length of high pressure inlet hose (128) provided with a quick connect/disconnect fitting (130) at its free end. The other end of the inlet hose (128) is permanently connected to the other equipment contained within the cart, as is discussed in more detail hereinafter with particular reference to FIG. 16. The inlet hose (128) should be sufficiently long so that the cart (10) can be located at any desired position within the vehicle's interior, and yet the quick connect/disconnect fitting (130) at the end of the hose (128) can be brought into proximity with a suitable outlet fitting permanently mounted inside the vehicle (see FIG. 15).

The foaming agent compartment (120) is provided with a suitable storage vessel (132) that is filled with a liquid foaming agent (134). Preferably, the foaming agent employed is of the fluoro-protein type which has the advantages of not freezing or otherwise being adversely effected by the temperature extremes that may be expected within the operational profile of the aircraft, as well as of forming a fire fighting foam that has exceptionally good coverage and adhesion, and is quite stable (that is to say, the water does not separate out and create a flooding condition within the aircraft). It should be understood, however, that the apparatus of the present invention can also be utilized with other types of foaming agents that are intended for fire suppression purposes upon being mixed with water and air.

The foaming agent container (132) is provided with a swiveling inlet (136) at the bottom thereof that is free to swivel about a swiveling fluid fitting (138) provided at the upper end of the container (132). As a result of this swiveling construction, the foaming agent inlet (136) will always be oriented downwards with respect to the aircraft's gravitational field and thus will always be submerged, even if only a small amount of foaming agent fluid is left in the tank (132).

Adjacent to the foaming agent container (132), there is located the pressurized gas compartment (122) which, as will be seen in the Figures, houses a high pressure tank (140) containing a supply of inert propellant gas such as Freon. The propellant tank (140) is provided with a pressure regulating control valve (142) which when opened permits the Freon inside the tank (140) to flow through a connecting pipe (144) into the top region (146) of the foam tank (132), thereby pressurizing the foaming agent (134) contained therein.

Figure 16:
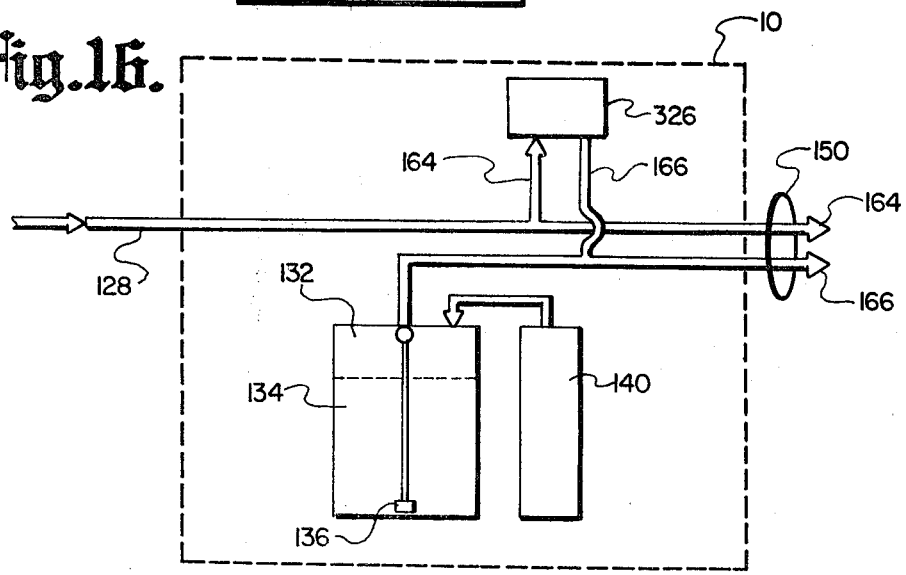
FIG. 16 is a schematic diagram of the equipment contained within the mobile cart component of FIG. 15.

The large upper compartment (124) of the cart (10) contains a mixing nozzle (148) permanently attached to one end of a double conduit flexible hose (150), the conduits at the other end thereof being in fluid communication with respectively the inlet water hose (128) and with the foaming agent tank (132) (see also FIG. 16). The flexible hose (150) is provided with two separate conduits, so that the foaming agent (134) contained in the tank (132) will not be mixed with the water prior to entering the mixing nozzle (148).

Figure 5:
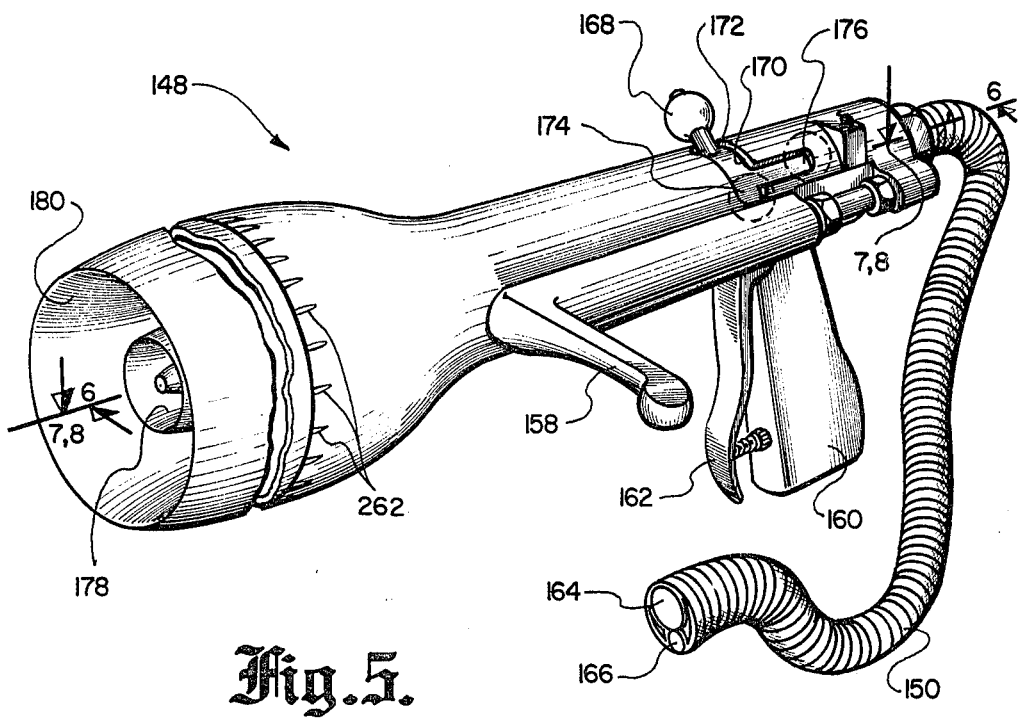
FIG. 5 is a perspective view of the front and rear portions of a mixing nozzle contained within the cart.
Figure 11:
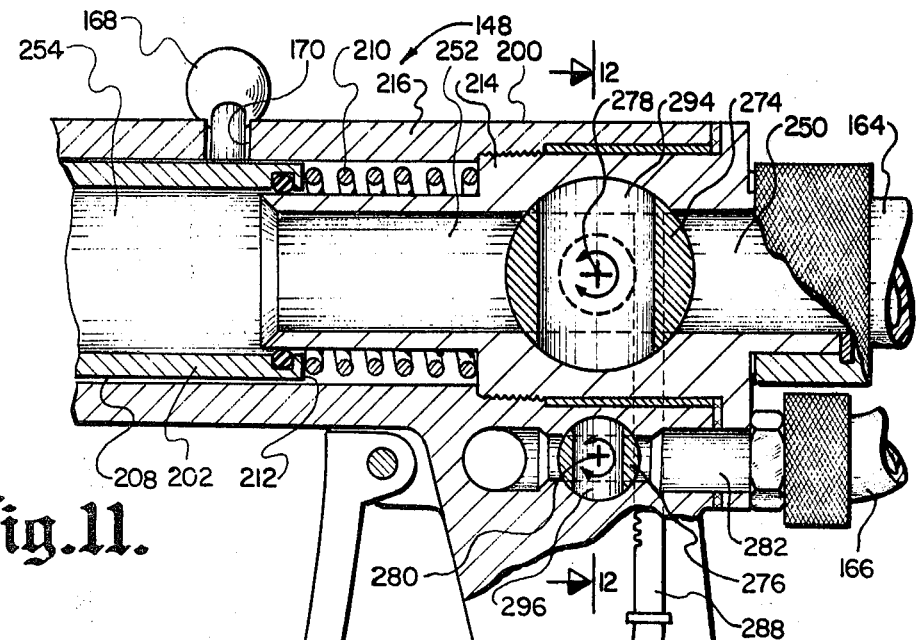
FIGS. 11, 12, 13 and 14 are cross-sectional partially cutaway views showing various details of the flow regulating mechanism in the nozzle.
Figure 13:
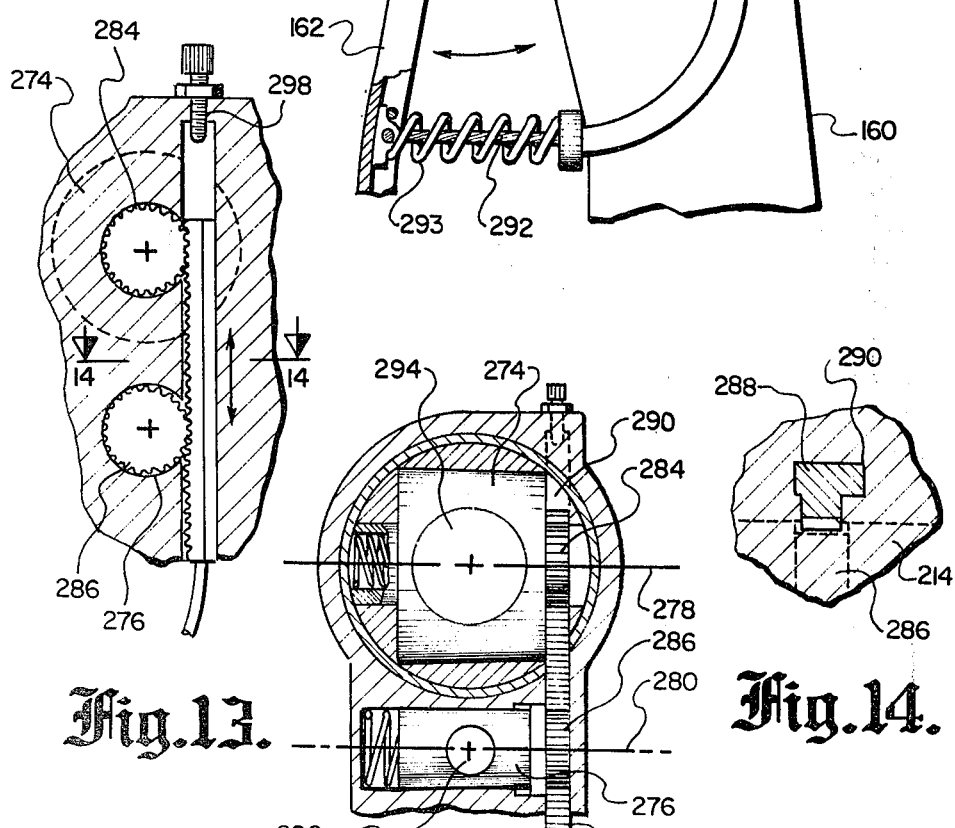
Figure 12:
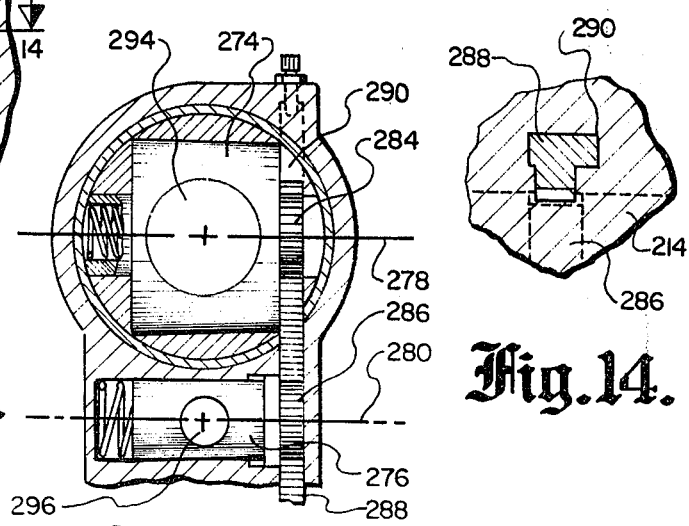
Figure 14:

Reference should now be made to FIGS. 4 and 5. FIG. 4 illustrates the cart's mixing nozzle (148) and the hose (150) in use during an emergency aboard an aircraft or other similar large vehicle. It will be seen that the cart (10) is guided by a first airline cabin attendant (152a), while a second cabin attendant (152b) is actually operating the spraying nozzle (148). In the Figure it can be seen also that the second cabin attendant (152b) is wearing a protective face shield (154) and heat resistant gloves (156) normally stowed in the miscellaneous compartment (126) on the cart (see FIG. 3). Furthermore, from FIG. 4 it can be appreciated that although the mobile cart (10) carries sufficient fire suppression equipment to suppress a considerable amount of fire and smoke, nevertheless, because it is not necessary for the cart (10) to hold a separate supply of water, the cart (10) may still be of sufficiently small dimensions so as to permit it to be conveniently maneuvered along the aisles of the aircraft cabin.

FIG. 5 shows the front and rear of the spray nozzle assembly (148) and how it is attached to the double conduit flexible hose (150). In this Figure it can be seen that the nozzle is provided with a convenient steady handle (158) and a pistol grip (160) having a control trigger (162). Thus, as best seen in FIG. 4, the spray nozzle assembly (148) can be so supported by the cabin attendant that he (she) is able both to aim the spray and control the rate of flow by firmly holding the steady handle (158) in his (her) left hand while holding the grip (160) in his (her) right hand, with at least one finger thereof wrapped around the trigger (162) so as to be able to exert a variable squeezing force thereon.

From FIG. 5 it will also be apparent that the two individual conduits contained within the flexible hose (150) are preferably a relatively large conduit (164) for water and a relatively small diameter conduit (166) for the foaming agent. A typical embodiment intended to provide an operational fire suppression capability for approximately 20 minutes at maximum flow rate from an assumed water availability of at least 100 gallons (380 liters) of using a foaming agent tank (132) holding about 4.5 gallons (17 liters) of foaming agent would have corresponding flow rates of 5.0 gallons per minute (19 liters per minute) of water and 0.26 gallons per minute (1.0 liter per minute) for the foaming agent. To provide such typical flow rates, it is desirable that the induction pressures of the water and of the foaming agent be on the order of 60–65 pounds per square inch (20–22 kilograms per square centimeter). At such flow rates and pressures, an internal diameter for the water conduit (164) of approximately 0.75 inch (1.9 centimeters) should be more than adequate; for the foaming agent conduit (166), a smaller diameter—less than 0.25 inch (0.6 centimeter)—is required. The necessary induction pressures are provided in the case of the foaming agent by the aforementioned propellant contained in the tank (140) and in the case of the water by an electrically driven booster pump (to be described in more detail hereinafter with particular reference to FIG. 15).

Also visible in FIG. 5 is a control knob (168) that may be utilized by the operator to select the various modes or functions of the nozzle (148), namely, a "water mist" mode, a "dense foam" mode and a "light foam" mode. It will be seen that the control knob (168) is free to be moved within a generally L-shaped slot or gate (170) such that it may be moved from a forward right position (172) to a forward left position (174) at the middle of the L and thence to a rear left position (176) and vice versa. As shown in the Figure, the control knob (168) is presently in its forward right position (172) in which the supply of foaming agent is altogether shut off and accordingly the nozzle (148) is functioning in its "water mist" mode. Furthermore, from this Figure, it may be seen that the front portion of the nozzle (148) is provided with a central spraying orifice (178) that is utilized when the nozzle is set in either its "water mist" or its "dense foam" mode and with an outer annular shaped outlet orifice (180) that is utilized only when the sprayer is set to its "light foam" mode.

Reference should now be made to FIGS. 6, 7 and 8 which are similar cross-sectional views (taken in the directions indicated by the corresponding arrows in FIG. 5) of the front and rear portions of the nozzle assembly (148) with its various operative components set respectively to the "water mist" mode, the "dense foam" mode and the "light foam" mode.

In the Figures, the flow of air is represented by solid white arrows; the flow of water is represented by solid black arrows, and the flow of the foaming agent is represented by gray arrows. Mixtures of the foregoing are represented by a plurality of differently shaded arrows representing their various constituents. Thus, a mist of water droplets suspended in air is represented by a combination of black and white arrows, a liquid mixture of water and the foaming agent is represented by a combination of black and gray arrows and the resultant fire suppression foam—which is a mixture of water and foaming agent and air—is represented by a combination of black, gray and white arrows.

At the outset it should be noted that the nozzle assembly (148) comprises two major components, namely, an outer barrel (200) and an inner sleeve (202). The outer barrel (200) is provided with a cylindrical bore (204) about a longitudinal axis (206). The outer surface of the sleeve (202) is in the shape of a circular cylinder (208) slightly less in diameter than the internal diameter of the cylindrical bore (204). Accordingly, the movable inner sleeve (202) is supported by the outer barrel (200) about a common longitudinal axis (206). Furthermore, the inner sleeve (202) can move back and forth in the direction of the longitudinal axis (206) relative to the outer barrel (200); the inner sleeve (202) may also rotate (through an angle of approximately 90° (see FIG. 9)) with respect to the outer barrel (200) about the longitudinal axis (206). A compression spring (210) exerts a compressive force in the forwards direction against the rear end (212) of the inner sleeve (202). The other end of this compression spring (210) is retained by a spring retainer (214) screwed into the rear portion (216) of the outer barrel (200). Thus, the force exerted by the compression spring (210) in the direction of the longitudinal axis (206) tends to bias the movable inner sleeve (202) in the forwards direction with respect to the outer barrel (200). An outwardly flared surface (218) is defined at the forward end (220) of the sleeve's cylindrical portion (208) and acts as a transition from a primary mixing throat (222) defined inside the inner sleeve (202) to its cylindrical exterior (208).

When the sleeve (202) is in its fully forward position (as illustrated in FIGS. 6 and 7), the outwardly flared forward end surface (218) mates against a corresponding outwardly tapered surface (224) at the rear of a fixed inner sleeve (226) rigidly supported with respect to the outer barrel (200) by means of a plurality of streamlined supports (228).

The interior of the fixed inner sleeve (226) defines a pear-shaped secondary mixing throat (230) extending from the outwardly tapered surface (224) at its rear end to an outwardly flared outlet (232) at its forward end. A teardrop-shaped valve closure member (234) is mounted inside the secondary mixing throat (230) and is rigidly attached to the movable inner sleeve (202) by a fixed supporting member (236) connecting the rear spherical portion (238) of the member (234). The pointed front end (240) of the teardrop-shaped member (234) is supported by a support shaft (242) rigidly attached to the fixed inner sleeve (226) by a support (244). The support shaft (242) is oriented along the nozzle's longitudinal axis (206) and is free to slide in and out of a corresponding longitudinal bore (246) (see FIG. 7) extending from the valve member's front (240) through its interior but not extending as far as the rear spherical surface (238). Thus, the spherical rearward end (238) of the valve closure member (234) may be displaced toward the rear of the fixed inner sleeve (226) and thereby will eventually close off the secondary mixing throat's slightly diametrically restricted rear entrance (248) as the movable inner sleeve (202) is pulled away from the fixed inner sleeve (226) (as shown in FIG. 8). However, since the closure member (234) has a streamlined teardrop shape, when it is in its open position (i.e., spaced apart from the entrance (248) to the fixed inner sleeve (226) as shown in FIGS. 6 & 7), there is provided a relatively streamlined unimpeded flow path provided through the nozzle (148) from the water inlet (250) connected to the water conduit (164) of the flexible hose (150) through the central bore (252) of the spring retainer (214), then through a mixing nozzle portion (254) of the movable inner sleeve (202), followed sequentially by the primary mixing throat (222), the secondary mixing throat's entrance (248), the secondary mixing throat (230) and finally the outlet (232) of the fixed inner sleeve (226). In order to eliminate possible cavitation effects at the junction between the mixing nozzle portion (254) and the primary mixing throat portion (222) defined inside the sliding inner sleeve (202), a bypass passage (256) is also within the outer barrel (200) provided for connecting the interior region of the mixing nozzle (254) before the mixing jet (258) with a peripheral rearward extension (260) of the primary mixing throat (222) that surrounds the front of the mixing jet (258).

Thus, as shown in FIG. 6, a jet of water under relatively high pressure exits from the central spraying orifice (178) defined by the flared outlet (232) of the fixed inner sleeve (226) and by the adjoining secondary mixing throat (230), where it mixes with air from a plurality of air inlets (262) connecting with an outer mixing chamber (264) provided between the forward portion of the outer barrel (200) and the fixed inner sleeve (226) contained therein, thereby forming a mist-like stream of water and air.

FIG. 7 is another cross section through the nozzle assembly (148) and shows the internal components thereof adjusted to the position where a relatively dense foam is output. Comparing FIG. 7 with FIG. 6, it should be noted that the longitudinal position of the various components is the same. However, the outer barrel (200) has been rotated relative to the movable inner sleeve (202) by approximately 90° from the position shown in FIG. 6 as a result of the control knob (168) being removed from its right forward position (172) to its left forward position (174) (see FIG. 5 as well as FIGS. 9 and 10). As a result, the outwardly flared forward end (218) of the movable inner sleeve (202) is still in mating contact with the outwardly tapered rear portion (224) of the fixed inner sleeve (226) and thus the teardrop-shaped valve closure member (234) is still displaced from the rear entrance (248) and a relatively smooth flow path is provided from the primary mixing throat (222) through the secondary mixing throat (240) and thence to the fixed inner sleeve's outlet orifice (232). However, the two bypass passages (256) (see also FIG. 6) have now been rotated with respect to the movable inner sleeve (202) such that they no longer provide a bypass flow path from the mixing nozzle portion (254) to the primary mixing throat portion (222) of the movable inner sleeve (202). Instead, the foaming agent is supplied via the foaming agent conduit (156) of the flexible hose (150) to a pair of foaming agent conduits (266) and thence via a front pair of foaming agent injection orifices (268) that are now aligned with the inlet opening portions (270) of the peripheral mixing throat extension (260) surrounding the outlet jet (258) associated with the mixing nozzle (254). The resultant interaction between the flow of the water from the outlet jet (258) and the flow of the foaming agent from the inlet opening portions (270) through the annular orifice defined between the peripheral extension (270) and the jet (258) causes the water and foaming agent to be mixed in the primary mixing throat (222) and further mixed in the secondary mixing throat (230), where it exits via the central outlet orifice (178) of the fixed inner sleeve (226) as a relatively homogeneous mix of water and foaming agent in the approximate ratio of 20 parts of water to 1 part of foaming agent. As described previously with respect to FIG. 6, as a result of this forceful flow of fluid from the outlet orifice (178), air (252) is drawn from the air inlets (262) through the outer mixing chamber (254) to aerate the fluid as it exits from the outlet orifice (232), thus resulting in the production of foam.

Reference is now made to FIG. 8 which, it will be recalled, shows the internal components of the nozzle assembly (148) positioned such that the nozzle is now in its "light foam" mode. In particular, it will be seen that the movable inner sleeve (202) has now been withdrawn to its rearward position in which the teardrop-shaped valve closure member (234) has now closed the rear entrance (248) to the secondary mixing throat (230) defined within the fixed inner sleeve (226) and at the same time the outwardly flared forward surface (218) of the movable inner sleeve (202) has been displaced to the rear of the corresponding tapered surface (224) at the rear end of the fixed inner sleeve (226). Accordingly, the fluid flow path between the primary mixing throat (222) and the secondary mixing throat (230) has now been shut off and an alternative flow path (272) has now been provided from the primary mixing throat (222) to the outer mixing chamber (264) provided between the inner surface of the outer barrel (200) and the outer surface of the fixed inner sleeve (226). By this means the air from the air inlet orifices (262) is mixed with the foam and water mixture while it is still contained within the outer mixing chamber (264).

Figure 17:
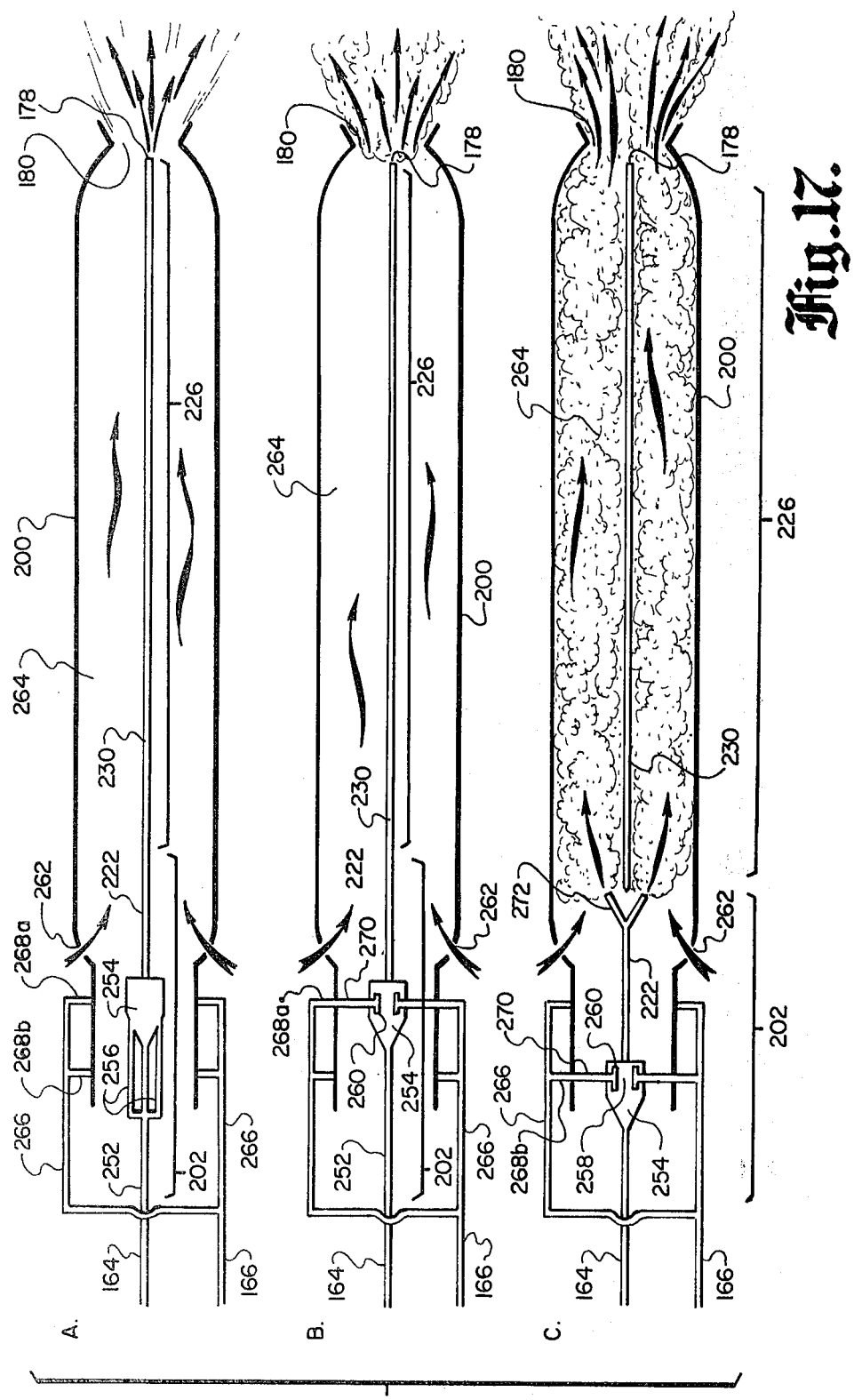
FIGS. 17a, b and c are schematic diagrams of the operation of the nozzle component of FIG. 15 when the control knob is respectively set to the "water mist" mode, to the "dense foam" mode and to the "light foam" mode.

As best seen in FIGS. 4 and 17, the outer mixing chamber (264) has a length-to-width ratio in excess of 10 to 1, and accordingly the mixture of water and foaming agent and air contained in the outer mixing chamber (264), although containing a quantity of air, is compressed to a small volume by the energy of the continuing flow of fluid entering the outer mixing chamber (264) from the alternate flow channel (272).

Thus, considerable expansion takes place in this compressed mixture of air, water and foaming agent after it has exited from the outer annular orifice (180) at the forward end (274) of the spray nozzle (148), with the result that the foam is relatively light in weight and (for a given quantity of fluid) occupies larger volume and can cover a greater area. However, because of its lighter density, the foam produced by the nozzle (148) when set to its "light foam" mode (the knob (146) in its left rear position (176)), has a shorter effective range even though an efficient mixing nozzle design has maximized the transfer of energy from the fluid to the foam. Accordingly, the left rear "light foam" position (176) of the control handle (174) is best reserved for "mop-up" operations after the "water mist" of the first position (right forward position (172)) has cleared the air of smoke and particulate matter and after the "dense foam" mode associated with the handle's (176) second position (namely, left forward position (174)) has effectively extinguished the bulk of the fire, leaving only an occasional hot spot.

Reference should now be made to FIGS. 11, 12, 13 and 14 which illustrate one possible embodiment for the flow regulating mechanism provided by the trigger (162) and the handle (160) of the spray nozzle (148). From these Figures, it can be seen that associated with the water inlet (250) and the foaming agent inlet (266), there is associated respectively a relatively large water flow regulating valve (274) and a relatively small foaming agent flow valve (276), each in the shape of a truncated cone having its axis of rotation (namely, a water valve axis (278) and foaming agent fluid valve axis (280)) oriented in parallel to the other and perpendicular to the respective flow paths through the respective water and foaming agent inlets (250, 282).

The water valve member (274) and the foaming agent fluid valve member (276) are each provided with a respective pinion gear (284, 286) that is fixedly mounted relative to its respective valve member (274, 276) and oriented along the respective valve member rotational axis (278, 280) such that a rotation of the pinion gear (284, 286) results in a corresponding rotation of the internal valve member (274, 276). Each of the two pinion gears (284, 286) is in meshing contact with a vertically oriented rack gear (288) slidably constrained by a vertical guide slot (290) defined within the nozzle's outer barrel rear section (216) and continuing through the spring retainer (214), such that a vertical up and down motion of the rack gear (288) results in a rotational opening and closing motion of the two valve members (274, 276). This vertical motion is imparted to the rack gear (288) via a flexible shaft (292) attached to the trigger (162). A biasing spring (293) is provided for biasing the trigger (162) away from the grip (160) such that the vertical rack gear (288) is normally in its lowermost position and the two rotating valve members (274, 276) are normally in their fully closed position with their respective interior bores (294, 296) oriented perpendicular to the respective inlet bores (250, 282) (see FIG. 11). However, when the operator squeezes the trigger (162) towards the grip handle (160), then the rack gear (288) is displaced towards its upper-most position until it is in contact with an adjustable upper limit stop (298) (see FIG. 13), whereupon the respective valve member interior bores (294, 296) are oriented parallel to the respective inlet bores (250, 282) (see FIG. 12) and the respective flow paths through the respective valve members are open and unrestricted.

Figure 15:
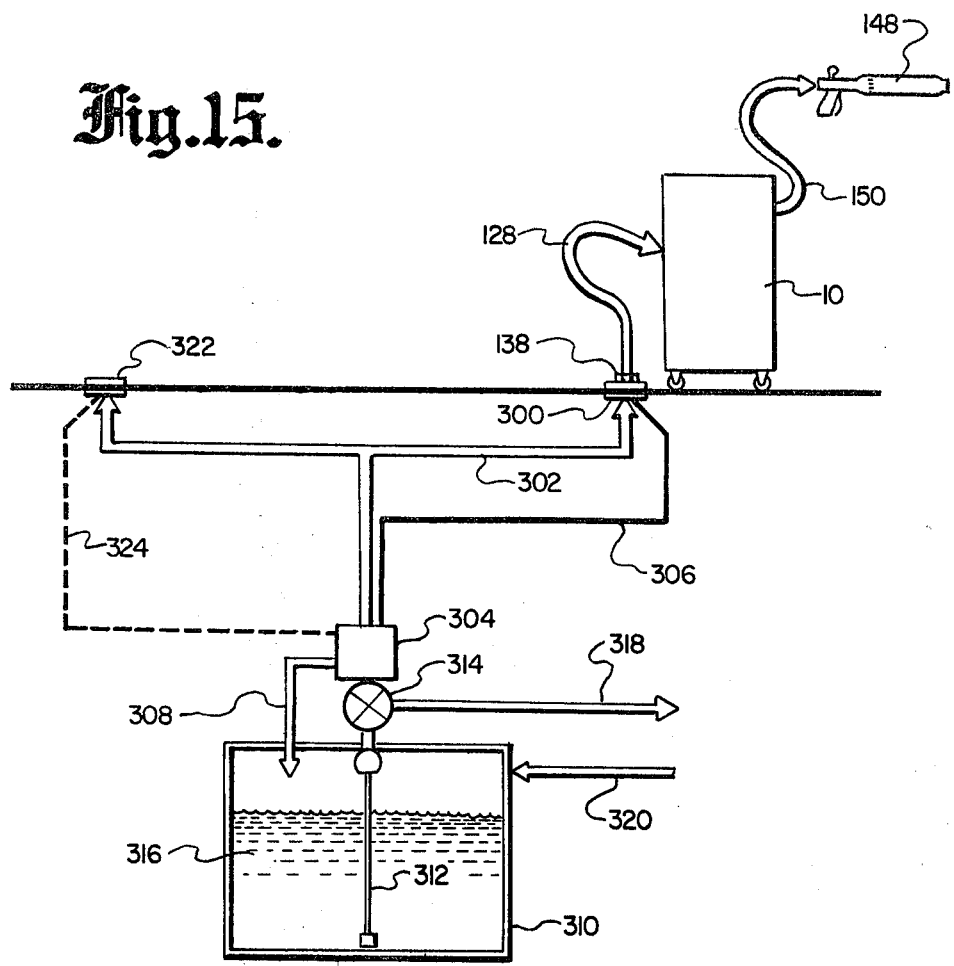
FIG. 15 is a schematic diagram showing the various major components of a fire suppression system in accordance with the present invention.

Referring now to FIGS. 15 and 16, which are schematic diagrams of the overall fire suppression system (FIG. 15) and of the cart portion thereof (FIG. 16), respectively, it will be noted that the quick connect/disconnect fitting (138) at the free end of the intake hose (128) is shown plugged into a first priority water supply outlet (300) that is connected by means of a priority water manifold subsystem (302) to a booster pump (304). The booster pump (304) is activated via a first control circuit (306) that is also connected to the first outlet fitting (300) and which, after the quick connect fitting (138) has been inserted into the outlet fitting (300), causes an appropriate electric signal to the supply via the control circuit (306) to the booster pump (304) thereby activating the booster pump to supply water at the required pressure (normally 60–65 pounds per square inch or 20.22 kilograms per square centimeter). The booster pump (304) is provided with an internal pressure release valve (not shown) and an overflow pipe (308). The booster pump (304) receives its water supply from the main water reservoir (310) of the aircraft through a conventional intake pipe (312) and through a priority transfer valve (314) which normally supplies the potable water (316) contained within the main reservoir (310) to the aircraft's regular utility water supply system (318). This regular utility water supply system is conventionally maintained at a relatively low pressure (about 10 pounds per square inch or 3.3 kilograms per square centimeter) by means of compressed air through a compressed air supply line (320). The transfer valve (314) is activated by the same electric signal as activates the booster pump (304) (i.e., the above-described electric signal input via the first control circuit (306)).

The priority manifold (302) is also connected to a second outlet fitting (322) to which is connected a second electrical control circuit (324). The second outlet fitting (322) and the second control circuit (324) are functionally identical to the first control outlet fitting (300) and the first control circuit (306); however, by providing a second such outlet (322) and associated control circuit (324), it becomes possible to utilize the cart (10) at different locations within the cabin of a large passenger aircraft without requiring an excessively long intake hose (128). It should be noted that the first and second outlets (300, 322) are both of the self-sealing type and are opened only after a quick connect/disconnect fitting (138) has been inserted. Furthermore, the control circuits (306, 324) are wired in parallel so that a control signal applied to either control circuit will result in the activation of the booster pump (304) of the transfer valve (314) such that the water (316) contained within the aircraft's main water supply (310), instead of being delivered at a relatively low pressure through the aircraft's normal utility water supply system (318), is instead delivered at a relatively high pressure to the priority water manifold (302) for use by the fire suppression equipment (148 etc.) contained aboard the cart (10).

Referring now to FIG. 16, which is a schematic diagram of the major functional components of the cart (10), it will be seen that the inlet line (128) is connected directly to the larger water conduit (164) contained within the flexible output hose (150). The other smaller conduit contained within output hose (150), namely, the foaming agent supply conduit (166), is connected to the fluid intake (136) of the foaming agent tank (132), which in turn is pressurized by the propellant contained within the propellant tank (140).

Also visible in FIG. 16 is an optional second water and foaming agent outlet fitting (326) whereby a second nozzle assembly (148) and a second flexible hose (150) may be connected to the foaming agent and water conduits (166, 164) provided within the fire suppression mobile cart (10). Of course, if such an optional second discharge system is utilized, it will be necessary to ensure that an adequate supply of both foaming agent and water is available to supply the two systems, paying particular attention to the output capacity of the booster pump (304) and the corresponding flow rate through the manifold (302) and the various other components common to the two discharge systems.

Reference should now be made to FIGS. 17a, b and c which, it will be recalled, are schematic diagrams of the operation of the nozzle component (148) when the control knob (168) is respectively set to its "water mist" position (172); to its "dense foam" position (174) and to its "light foam" position (176).

Now referring specifically to FIG. 17a, it will be seen that the high pressure water supply from the water conduit (164) is fed directly to the central outlet (178) at the forward end of the nozzle (148) via the central bore (252) at the rear of the movable inner sleeve (202), to the inner sleeve's mixing nozzle region (254), through the primary throat region (222) which in turn is directly coupled to the secondary mixing throat (230) of the fixed inner sleeve (226) and thence to the central outlet orifice (178). At the same time, there is provided a bypass flow from the rear central bore (252) to the mixing nozzle portion (254) via a pair of bypass passages (256) which tends to minimize any cavitation effects in the vicinity of the mixing jet (258).

It will also be seen from FIG. 17a, that, when the nozzle (148) is set to its "water mist" mode, the foaming agent fluid carried by the smaller conduit (166) of the double conduit flexible hose (150) and by the pair of foaming agent conduits (266) provided within the nozzle assembly (148) is interrupted at the forward ends of the two pairs of foaming agent injection orifices (268a, 268b).

Referring now specifically to FIG. 17b—a schematic diagram of the nozzle operation during the production of dense foam—it will be seen that, in contrast to the conditions shown in FIG. 17a, the bypass passageway (256) is no longer in fluid communication between the rear central bore (252) and the mixing nozzle area (254); furthermore, the front pair of foaming agent injection orifices (268a) are now aligned with the inlet opening portions (270) of the primary mixing throat's peripheral rearward extension (260) and, accordingly, the water entering the nozzle assembly (148) via the water conduit (164) and the foaming agent entering the nozzle assembly (148) via the foaming agent conduit (166) are mixed together at the juncture between the mixing nozzle (254) and the primary mixing throat (222) and are further mixed with one another in the primary mixing throat area (222) and the secondary mixing throat area (230) until they exit as a thoroughly mixed stream of liquid from the central front outlet orifice (178) where the liquid stream is aspirated by air drawn out of the outer annular shaped outlet orifice (180) at the forward end of the nozzle (148), the air having entered the nozzle through the air inlets (262) provided at the rearward end of the outer mixing chamber (264).

Referring now specifically to FIG. 17c—a diagrammatic illustration of the function of the nozzle's various components during the production of a light foam—it will be seen that the operation of the mixing nozzle portion (254), of the mixing jet (258) and of the primary mixing throat (222) (including its peripheral rearward extension (260)) is substantially the same as shown in FIG. 17b for the "dense foam" mode. However, the foaming agent fluid is introduced into the annular orifice surrounding the mixing jet (258) and formed by the primary mixing throat's rearward extension (260) not via the front pair (268a) but rather through the rear pair (268b) of the foaming agent injection orifices; furthermore, the primary mixing throat (222) is physically separated from the secondary mixing throat (230) and accordingly the fluid mix of water and foaming agent in the primary mixing throat (222) is injected into the outer mixing chamber (264) via the alterate flow path (272) where it is directly mixed with the air from the air inlets (262) and the resultant foam is forced along the entire length of the outer mixing chamber (264) until it exits from its front end via the annular shaped outer orifice (180).

Although the invention has been described in detail above with reference to a particular embodiment intended specifically for use within the passenger compartment of an aircraft, it should be understood that many of the basic concepts and principles underlying the present invention will have applicability elsewhere. Furthermore, even on a large commercial passenger aircraft, the above-described embodiment could also be utilized to suppress fires in relatively inaccessible areas of the aircraft (such as in the areas between the outer skin of the aircraft and the inner walls of the passenger compartment) by opening up a small access hole through which water, light foam and/or dense foam could be injected by means of the above-described nozzle sprayer (148).

Thus, it is apparent that there has been provided with this invention a novel Stowable Fire Suppression System for Aircraft Cabins and The Like which fully satisfies the objects, means and advantages set forth hereinbefore. Furthermore, it is evident that many alternatives, modifications and variations will be apparent to those skilled in the art in light of the foregoing description. Accordingly, the present Application for Letters Patent is intended to embrace all such alternatives, modifications and variations as fall within the spirit and broad scope of the appended claims.

I claim:

1. A fire suppression system stowable within a passenger area of a pressurized cabin of an aircraft in flight comprising:
   a supply of water;
   a water outlet accessible from inside said passenger area;
   booster means for supplying said water to said outlet under pressure;
   a mobile fire suppression cart, said cart further comprising:
   a flexible water inlet hose;
   means for effecting a fluid connection between said inlet hose and said water outlet;
   a source of foaming agent;
   means for pressurizing said foaming agent;
   a double conduit flexible outlet hose having one conduit in fluid communication with said source of foaming agent and another conduit in fluid communication with said water inlet hose; and
   a mixing nozzle connected at one end of said flexible outlet hose for selectively mixing said water, said foaming agent and air to produce a heavy mist of plain water, a relatively dense foam, and a relatively light foam.

2. The fire suppression system of claim 1, wherein said water inlet hose further comprises a quick connect/disconnect fitting for effecting said fluid connection and wherein said water outlet further includes control means for activating said booster means to impart a pressure of at least 60 pounds per square inch to said water at said water outlet once said quick connect/disconnect fitting has been connected to said water outlet.

3. The fire suppression system of claim 2, wherein said pressurized cabin is provided with a plurality of fire suppression system water outlets, each substantially identical to said water outlet.

4. The fire suppression system of claim 1, wherein said foaming agent is fluoro-protein foam.

5. The fire suppression system of claim 1, wherein said mixing nozzle comprises a movable cylindrical sleeve contained within a cylindrical barrel so as to define a primary fluid mixing throat area through which is injected said water and into which may also be selectively injected said foaming agent, and also defining a plurality of air inlets leading to an elongated outer foam mixing chamber into which the mixed fluid from said primary mixing throat area may selectively be diverted and to be mixed with air from said air inlets.

6. The fire suppression system of claim 5 wherein said mixing nozzle further comprises a fixed inner sleeve defining a secondary throat mixing area into which the mixed fluid from said primary throat mixing area may selectively directly flow, thereby bypassing said outer foam mixing chamber.

* * * * *